(12) United States Patent
Fielding

(10) Patent No.: US 6,605,132 B2
(45) Date of Patent: Aug. 12, 2003

(54) AIR TREATMENT SYSTEM

(75) Inventor: Robert Michael Fielding, Northumberland (GB)

(73) Assignee: Domnick Hunter Limited, Birtley (GB)

( * ) Notice: Subject to any disclaimer, the term of this patent is extended or adjusted under 35 U.S.C. 154(b) by 0 days.

(21) Appl. No.: 10/051,218

(22) Filed: Jan. 18, 2002

(65) Prior Publication Data

US 2002/0056373 A1 May 16, 2002

Related U.S. Application Data

(63) Continuation of application No. 09/714,850, filed on Nov. 15, 2000, now abandoned.

(30) Foreign Application Priority Data

Nov. 17, 1999 (GB) .............................................. 9927018
Jun. 28, 2000 (GB) .............................................. 0015684

(51) Int. Cl.[7] .......................................... B01D 53/047
(52) U.S. Cl. ........................... 95/22; 95/139; 95/148; 454/229
(58) Field of Search ............................ 95/22, 90, 139, 95/148; 96/130; 55/385.2; 454/75, 158, 70, 236, 229; 62/642, 908

(56) References Cited

U.S. PATENT DOCUMENTS

| | | | | |
|---|---|---|---|---|
| 2,545,194 A | * | 3/1951 | Colburn et al. | 62/271 |
| 3,659,400 A | * | 5/1972 | Kester | 423/230 |
| 4,741,882 A | * | 5/1988 | Weichselgartner | 422/122 |
| 4,989,499 A | * | 2/1991 | Scoccia et al. | 98/1.5 |
| 5,082,471 A | * | 1/1992 | Athayde et al. | 95/51 |
| 5,090,972 A | * | 2/1992 | Eller et al. | 95/10 |
| 5,221,520 A | * | 6/1993 | Cornwell | 422/122 |
| 5,451,248 A | * | 9/1995 | Sadkowski et al. | 426/419 |
| 5,890,366 A | * | 4/1999 | Yang | 62/6 |
| 5,954,577 A | | 9/1999 | Meckler | |
| 5,984,773 A | * | 11/1999 | Gervais et al. | 454/70 |
| 6,099,617 A | * | 8/2000 | Bennett | 95/99 |
| 6,193,785 B1 | * | 2/2001 | Huf | 95/139 |
| 6,364,938 B1 | * | 4/2002 | Birbara et al. | 95/139 |

FOREIGN PATENT DOCUMENTS

| | | |
|---|---|---|
| DE | 196 53 964 A1 | 6/1998 |
| GB | 2 131 541 A | 6/1984 |
| JP | 63-213734 A * | 9/1988 |
| JP | 2-92374 A * | 4/1990 |
| JP | 02-258008 A * | 10/1990 |
| JP | 11-235999 A * | 8/1999 |
| WO | WO 96/41725 | 12/1996 |
| WO | WO 96/41725 A1 * | 12/1996 |
| WO | WO 97/15791 A1 * | 5/1997 |
| WO | WO 99/03693 | 1/1999 |

* cited by examiner

Primary Examiner—Duane Smith
Assistant Examiner—Frank M. Lawrence
(74) Attorney, Agent, or Firm—Workman, Nydegger & Seeley

(57) ABSTRACT

A system for treating air for supply to an enclosed space in which the air is to be breathed, includes an inlet through which air can enter the system from atmosphere for supply to the enclosed space, and a regenerative adsorption assembly having at least two chambers which contain an adsorbent material, arranged so that air flowing in the inlet for supply to the enclosed space can pass through one of the chambers for adsorption of contaminants before supply to the enclosed space while adsorbent material in another of the chambers is purged of adsorbed contaminants. A recirculation path is provided for supplying air from the enclosed space to the inlet to be mixed with air from atmosphere before it is supplied to the enclosed space. The system includes structure for adjusting the resistance to flow of air through the recirculation path.

21 Claims, 2 Drawing Sheets

AIR TREATMENT SYSTEM

CROSS-REFERENCE TO RELATED APPLICATIONS

The present application is a continuation of U.S. patent application Ser. No. 09/714,850, filed Nov. 15, 2000, now abandoned, which claims priority to Great Britain Application Nos. 0015684.4, filed Jun. 28, 2000 and 9927018.3, filed Nov. 17, 1999, which applications are incorporated herein by specific reference.

BACKGROUND OF THE INVENTION

1. The Field of the Invention

This invention relates to a system for treating air for supply to an enclosed space in which it is to be breathed.

2. The Relevant Technology

It can be desirable to treat air that is to be breathed to remove contaminants and also to provide a suitable proportion of the individual components of an air mixture (oxygen, carbon dioxide, nitrogen etc). Contaminants that are to be removed might be solid (in particulate form), liquid (in aerosol form) or gaseous. The enclosed space in which the treated air is to be breathed might be a building or a vehicle. An example of an application for the system of the invention might be for example in an agricultural vehicle which can be exposed to an environment containing particulate and liquid or gaseous materials which preferably the driver of the vehicle should not be exposed to.

It is known to remove contaminants from a gas using regenerative adsorption apparatus. Such apparatus comprises at least two chambers, each containing a quantity of an adsorbent material. The gas is directed to flow through one of the chambers so that it can be treated while the adsorbent material in the other chamber is regenerated by displacement from it of the contaminant material which has previously been adsorbed while pressure in that chamber is reduced. The adsorbed component can be displaced by means of a purge stream of gas which might be taken from the outlet stream from the chamber in which adsorption is taking place. The regeneration of the adsorbent material can involve changes in one or both of the pressure and temperature in the chamber, especially a reduction in the pressure in the chamber and an increase in the temperature.

It is a disadvantage of known regenerative adsorption assemblies that large chambers can be required in order to provide sufficient adsorbent material to treat enough air adequately for it to be breathed, especially when the contaminants in the air only bond loosely to the adsorbent material

BRIEF SUMMARY OF THE INVENTION

According to the present invention, a system for treating air for supply to an enclosed space includes a regenerative adsorption assembly and a recirculation path for supplying breathed air from the enclosed space to be mixed with air from atmosphere before it is supplied to the enclosed space Accordingly, in one aspect, the invention provides a system for treating air for supply to an enclosed space in which it is to be breathed, which comprises:

a. an inlet through which air can enter the system from atmosphere for supply to the enclosed space;

b. a regenerative adsorption assembly comprising at least two chambers which contain an adsorbent material, arranged so that air flowing in the inlet for supply to the enclosed space can pass through one of the chambers for adsorption of contaminants before supply to the enclosed space while adsorbent material in another of the chambers is purged of adsorbed contaminants;

c. a recirculation path for supplying air from the enclosed space to the inlet to be mixed with air from atmosphere before it is supplied to the enclosed space; and d. means for adjusting the resistance to flow of air through the recirculation path according to the resistance that is provided to the flow of air from atmosphere into the enclosed space.

The system of the invention has the advantage that the load on the adsorbent material from contaminants in air which enters the system from the atmosphere is reduced so that adequate adsorption of the contaminants in air is possible with chambers for the adsorbent material in the pressure swing adsorption assembly which are smaller than are required conventionally without the recirculation path feature of the system.

The provision of means for adjusting the resistance to flow of gas through the recirculation path can ensure that the recirculated air and atmospheric air can be mixed in a desired ratio by allowing increased flow of recirculated air when the resistance to flow of atmospheric air is increased. Such an increase in the resistance to flow of atmospheric air can result from an increase in the air flow that is admitted to the enclosed space through one of the chambers which contain adsorbent material.

The resistance to flow of gas through the recirculation path can be adjusted by means of a variable flow restrictor. Such a component can be driven by an electrical motor in response to signals from control components. Preferably, however, the flow resistance is varied by provision of two or more recirculation paths which present different resistances to flow of gas through them, the system including means for changing the recirculation path through which the recirculated gas flows. For example, the system can provide two recirculation paths. One of them can provide little or no resistance to flow of air for use when air flows directly into the enclosed space and does not pass through the adsorption assembly. The other recirculation path provides greater resistance to flow of air for use when air flows into the enclosed space after flowing through the adsorption assembly. The selection of the recirculation path for the air can be made using appropriate valves which can be controlled by signals from control components.

In another aspect, the invention provides a method of treating air for supply to an enclosed space in which it is to be breathed, which comprises:

a. admitting air to an air treatment system from atmosphere;

b. mixing the air from atmosphere with recirculated air from the enclosed space;

c. passing the mixture through a chamber of a regenerative adsorption assembly comprising at least two such chambers, each containing an adsorbent material for adsorption of contaminants; and d. supplying the air from the chamber after it has passed over the adsorbent material to the enclosed space.

Preferably, the system includes means for adjusting the relative proportions of the air from atmosphere and the air that is recirculated from the enclosed space that are mixed before supply to the enclosed space. This allows the extent of the treatment of the air that is supplied to the enclosed space to be adjusted according to the amount of contamination that is in the atmospheric air. For example, atmospheric air that is relatively clean and which only requires moderate treatment (if any) can be supplied to the enclosed space with little or no recirculated air. When the atmospheric air contains significant quantities of contaminant material, it will be supplied to the enclosed space with relatively more recirculated air, for example, so that the air that is supplied to the enclosed space comprises at least 40% recirculated air, and possibly at least 50% or at least 60% or more. The availability of recirculated air means that the load placed on the adsorbent material in the chambers need not become too high, even when atmospheric air contains high concentrations of contaminant material.

The means for adjusting the relative proportions of atmospheric and recirculated air can comprise a valve. The valve preferably provides constrictions against flow of the air from atmosphere and of the recirculated air, with the size of the at least one of the constrictions being variable. The valve makes it possible for the air from atmosphere and from the enclosed space to mix, notwithstanding the possibility that the air in the enclosed space is at a higher pressure than the air from atmosphere. Preferably, the valve considered as a whole amounts to a 3:2 valve with two inlet ports for the atmospheric and recirculated air, and an outlet port for the mixed air. Preferably, the valve is capable of closing completely the path for air to flow from atmosphere directly into the enclosed space, for example, in the event that there is an unexpected drop in air pressure within the enclosed space so that the pressure there is less than atmospheric pressure.

Preferably, the system includes a by-pass line for air from atmosphere to flow past the regenerative adsorption assembly when the air from atmosphere contains little or no contaminants. When air is supplied to the enclosed space directly from atmosphere, the system can be operated without recirculation of air from the enclosed space so that the air that is supplied to the enclosed space consists entirely of air from atmosphere. The resistance to flow of the recirculated gas can be adjusted to take into account the variation in the resistance to flow of gas entering the enclosed space.

The system will generally include a blower for forcing air into the enclosed space to maintain it at a pressure that is above atmospheric pressure. Preferably, the system includes a pressure sensor for monitored the pressure within the enclosed space, the blower being adjustable according to the monitored pressure to maintain the pressure within the enclosed space below a predetermined maximum pressure. This has the advantage that a positive pressure can be maintained within the enclosed space without admitting more air to the space than is necessary for this purpose. This has the advantage that the size of the chambers of adsorbent material can be kept small.

Preferably, the system includes means for detecting contaminant material in air that is admitted to the system from atmosphere and which are not to be admitted to the enclosed space. Signals from the detection means can control a by-pass line by which air from atmosphere flows past the regenerative adsorption assembly, closing the by-pass line when contaminant material is detected. When the detection means can quantify the amount of the contaminant material in the atmospheric air, a signal from the detection means can be used to control the relative proportions of the air from atmosphere and the air that is recirculated from the enclosed space that are mixed before supply to the enclosed space.

Preferably, the regenerative adsorption assembly is arranged to provide a change in the pressure or the temperature or both in each chamber between the phase when the chamber is exposed to air that is to be treated and the phase when the adsorbent material in the chamber is regenerating. Preferably, the assembly is arranged so that the difference in pressure in each chamber between the adsorption and regeneration phases is at least about 750 mbarg, more preferably at least about 1000 mbarg, especially at least about 1500 mbarg. When the difference between pressure within a chamber in the adsorption phase and atmospheric pressure is less than the difference between the pressures in the chamber in the adsorption and regeneration phases, the assembly can include a pump for reducing the pressure in a chamber of the regenerative adsorption assembly below atmospheric pressure during regeneration of that material. Such a pump might reduce the pressure in the chamber to at least about 400 mbar below atmospheric pressure, preferably at least about 600 mbar. The pump can have other functions: for example, it can be used to draw atmospheric air into the system.

The regenerative adsorption assembly will comprise at least two chambers. Two chambers will be sufficient for many applications. However, it might be preferred for some applications to use an adsorption assembly which includes more than two chambers. This has the advantage that the air flow speed through the chambers can be reduced, giving rise to reduced resistance to air flow.

Preferably, the assembly includes means for heating the adsorbent material in a chamber of the regenerative adsorption assembly during regeneration of that material. The heat can be supplied by one or more electric heaters located within the chamber. The temperature to which the adsorbent material is heated will be selected having regard to factors which include the nature of the adsorbent material, the strength of the interactions between the adsorbent material and adsorbed contaminants, the quantity of the contaminant material that has been adsorbed, and the energy required to heat the adsorbed material. A relatively high temperature can be preferred to optimise the purge of the adsorbed material.

Preferably, the system is configured so that the air from atmosphere and the air that is recirculated from the enclosed space are mixed upstream of the regenerative adsorption assembly so that the mixed air passes through one of the chambers for adsorption of contaminants before it is supplied to the enclosed space. The treatment of the air as it passes over the adsorbent material can then include adsorption of exhaled carbon dioxide in the recirculated air as well as adsorption of contaminants in atmospheric air. It has been found that this combined adsorption is possible without an undesirable increase in the size of the chambers for the adsorbent material. Adsorbed carbon dioxide can be discharged from the system when the adsorbent material is regenerated. An acceptable air composition for breathing is then established in air that is supplied to the enclosed space from oxygen in air supplied from atmosphere.

Preferably, the system includes a purge line through which air is supplied to a chamber of the regenerative adsorption assembly in which the adsorbent material is to be regenerated, the purge line supplying air from the outlet from the chamber through which air has flowed for adsorption of contaminants. The proportion of air from the chamber which flows in the purge line is preferably not more than about 25%, especially not more than about 5%.

The system can include components for treating air that is admitted from atmosphere. For example, the system can include means for heating or cooling the air which is admitted from atmosphere. This can have the advantage that the process of adsorbing contaminants in the air can be made more efficient. The system can include means for collecting liquid droplets carried in air that enters the system from atmosphere. This can take the form of a centrifugal separator in which vanes impart a spiralling flow to the air leading to liquid droplets carried by the air being made to coalesce; such separators are known. The system can include a filter for removing particulate contaminants from air entering the system through the inlet. Suitable filter media include borosilicate glass microfibres. The system can include means for controlling the temperature or the humidity or both of the air that enters the enclosed space, for example for the comfort of persons within the space. Suitable air conditioning equipment apparatus which can be used for this purpose are well known.

The system of the invention can be used to remove materials in vapour, liquid and particulate form from air that is to be breathed. The nature of the adsorbent material will be selected according to the nature of the contaminants in the air. Examples of suitable adsorbent materials include activated carbons and molecular sieves.

These and other objects and features of the present invention will become more fully apparent from the following description and appended claims, or may be learned by the practice of the invention as set forth hereinafter.

BRIEF DESCRIPTION OF THE DRAWINGS

Embodiments of the present invention will now be described by way of example with reference to the accompanying drawings, in which.

DETAILED DESCRIPTION OF THE PREFERRED EMBODIMENTS

Figure 1:
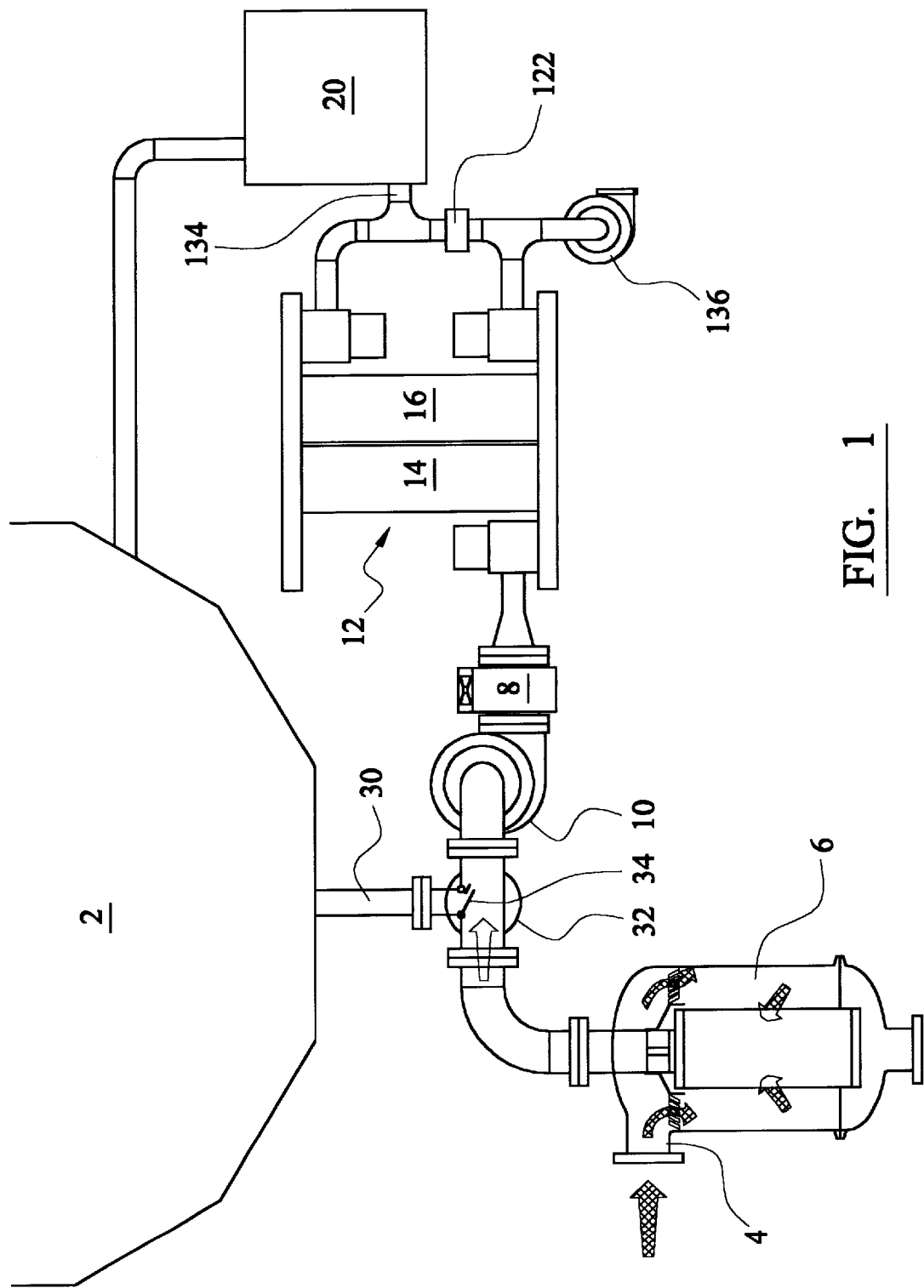
FIG. 1 is a schematic view of the system of the invention.

Referring to the drawings, FIG. 1 shows a system for supplying treated air to an enclosed space 2. Air enters the system from atmosphere through an inlet 4. It passes through a filter 6 in which particulate contaminants are removed. The filter can also cause liquid contaminants (in the form of aerosol droplets) to coalesce so that they can be collected from the base of the filter chamber. Preferably, the filter is capable of collecting particulate contaminants with a particle size down to about 0.01 $\mu$m. It can be made from glass microfibres.

Filtered air is then made to flow through a heat exchanger 8 by means of a pump (or blower) 10. The pump can also ensure that a positive pressure is maintained in the enclosed space. The air is conditioned in the heat exchanger so that the temperature and humidity of the air are optimised for adsorption of gaseous contaminants in the air. The temperature and humidity conditions are selected according to the nature of the adsorbent material and the gas components.

Figure 2:
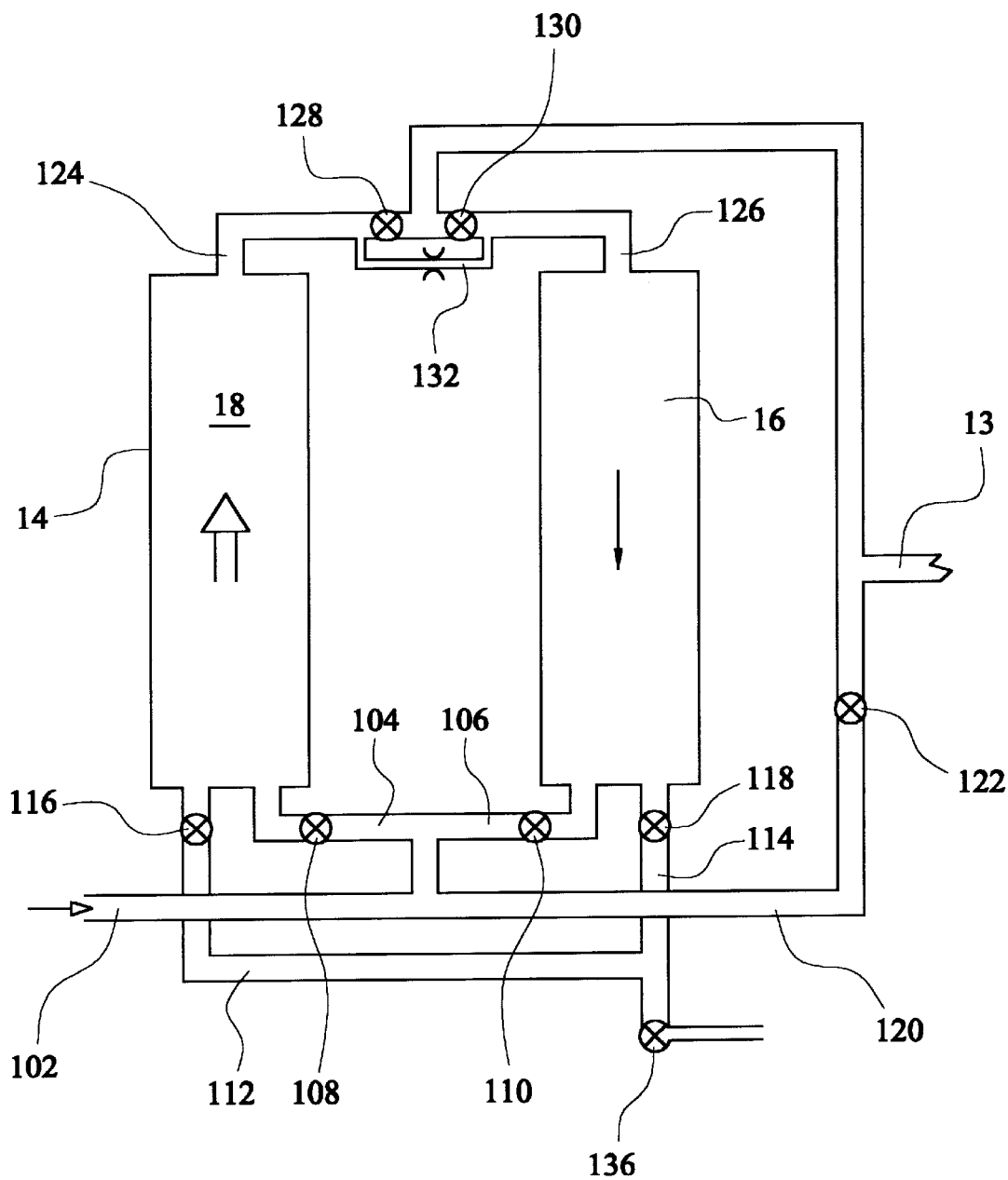
FIG. 2 is an enlarged view of the regenerative adsorption assembly which is incorporated in the system shown in FIG. 1.

The air is then supplied to a regenerative adsorption assembly 12 which is shown in more detail in FIG. 2. The assembly comprises two chambers 14, 16. Each chamber contains a material 18 which adsorbs gaseous contaminants in the air. Air is fed to the assembly through an assembly inlet 102. The inlet divides into left and right branches 104, 106 for supply of air to the chambers 14, 16. Each inlet branch has a valve 108, 110 in it for controlling the supply of air to the chambers.

Purge branches 112, 114 communicate with each of the chambers 14, 16 at the same ends thereof as the inlet branches 104, 106. The flow of air through each of the purge branches is controlled by means of purge branch valves 116, 118.

A by-pass branch 120 communicates with the assembly inlet 102. The flow of air through the by-pass branch is controlled by means of a by-pass branch valve 122. Air that is to be treated flows through the chambers over the adsorbent material. Air leaves the chambers through outlets 124, 126. The flow of air through the outlets is controlled by means of outlet control valves 128, 130. A purge stream line 132 extends between outlets 124, 126 to permit a small amount of gas to flow between the chambers when there is a pressure differential between them.

Air is supplied to the enclosed space from the outlets 124, 126 and from the by-pass branch 120, through a supply line 134, subject to the settings of the valves in the assembly.

In use, no air flows through the chambers when the level of contaminants in the air is low. Instead, air flows from the inlet branches 104, 106 to the supply line 134 through the by-pass branch 120. The inlet branch valves 108, 110 and the outlet control valves 128, 130 are closed during this mode and the by-pass branch valve 122 is open.

When the air contains contaminants, the by-pass branch valve 122 is closed so that air cannot flow directly from the inlet 102 to the supply line 134. For a first one 14 of the chambers, the inlet branch valve 108 is open and the purge branch valve 116 is closed. For the other 16 of the chambers, the inlet branch valve 110 is closed and the purge branch valve 118 is open. As a result, air entering the assembly through the inlet 102 passes through the first chamber 14 where it flows over the adsorbent material 18 therein so that contaminants in the air are adsorbed. The outlet control valve 128 for that chamber is open so that air leaving the first chamber 14 can flow to the supply line 134. The outlet control valve 130 for the other chamber is closed so that there is substantially no flow of air into or out of the second chamber 16. There is, however, a small purge stream of air through the purge stream line 132 from the first chamber into the second chamber. This small stream of air is able to flow through the second chamber in a direction that is opposite to the direction in which air flows when it is being treated. By virtue of the settings of the inlet branch valve 110 and the purge branch valve 118, the purge stream passes into the purge branch 114. Its flow is facilitated by means of a vacuum pump 136. During the purge phase of the second chamber, power is supplied to electric heaters (not shown) within the chamber, by which the temperature of the adsorbent material is heated to facilitate purging of adsorbed material thereon.

After a predetermined period of exposure to contaminated air, or when the level of detected adsorbed contaminants in the first chamber exceeds a predetermined level, the positions of the valves in the inlet and purge branches, and of the outlet control valves, are switched so that the first chamber is purged of adsorbed contaminants while the second chamber is exposed to the air which needs to be treated.

When the air which is admitted to the system is no longer contaminated, the assembly can be switched back to the by-pass mode in which all of the inlet branch valves 108, 110 and the outlet control valves 128, 130 are closed and the by-pass branch valve 122 is open.

Generally, each of the valves that are incorporated in the adsorption assembly as described above will be a driven valve whose position is controlled by means of signals that are supplied to it by an external controller. For example, the valves include a solenoid which can move the valve in response to a signal, for example supplied by automated control apparatus.

Referring now to FIG. 1, the air that leaves the regenerative adsorption assembly 12 through the supply line 134 passes through an air conditioning unit 20 in which the temperature or humidity or both of the treated air are adjusted for the comfort of persons who are to breathe the air. The air is then supplied to the enclosed space 22 in which it is to be breathed.

The system includes a recirculation path 30 and a recirculation control valve 32 at which air the recirculation path 30 is mixed with air which enters the system from atmosphere through the inlet 4. Air enters the recirculation path from the enclosed space 2. The air which flows in the recirculation path has previously passed through the regenerative adsorption assembly (if it contained contaminants when it entered the system). The mixture of the air from atmosphere with air from the enclosed space therefore reduces the concentration of contaminants in the mixed air to which the adsorption assembly is exposed. Carbon dioxide that is present in the recirculated air is adsorbed from the air which flows through the adsorption assembly, and is purged from the adsorption assembly with adsorbed contaminants.

The relative proportions of air from atmosphere and recirculated air are controlled by means of the recirculation control valve 32. When the air from atmosphere does not contain contaminants, the control valve 32 can be set so that the air which enters the enclosed space 2 wholly or largely consists of atmospheric air. When the air from atmosphere contains contaminants, the proportion of recirculated air can be increased to as much as 40% or more.

The recirculation control valve 32 can incorporate a closure member 34 which closes automatically in response to a reduction in air pressure within the enclosed space 2 to prevent flow of air in the system inlet 4 directly into the enclosed space 2 via the recirculation path 30.

The system can include sensors which can detect contaminants in air which enters the system through the inlet 4. Signals can be generated in response to changes in the concentrations of the contaminants to control the valves in the system.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed is:

1. A method of treating air for supply to an enclosed space in which it is to be breathed, the method comprising:
   providing contaminated air from the atmosphere and/or contaminated air recirculated from the enclosed space, the contaminated air comprising carbon dioxide and contaminants, the contaminants being other than oxygen, carbon dioxide, and nitrogen;
   passing the contaminated air through a first chamber of a regenerative adsorption assembly, the regenerative adsorption assembly comprising at least two chambers, wherein each chamber of the regenerative adsorption assembly contains an adsorbent material for adsorption of (i) the carbon dioxide in the contaminated air, and (ii) the contaminants in the contaminated air, wherein the regenerative adsorption assembly produces treated air that has an acceptable composition for breathing; and
   supplying the treated air from the regenerative adsorption assembly to the enclosed space.

2. The method as recited in claim 1, further comprising adjusting the relative proportions of the contaminated air from the atmosphere and the contaminated air recirculated from the enclosed space before passing the contaminated air to the regenerative adsorption assembly.

3. The method as recited in claim 1, further comprising mixing the contaminated air horn the atmosphere and the contaminated air recirculated from the enclosed space before passing the contaminated air to the regenerative adsorption assembly.

4. The method as recited in claim 1, further comprising supplying a purge stream of gas to each of the chambers of the regenerative adsorption assembly to purge adsorbed material from the adsorbent material therein.

5. The method as recited in claim 4, further comprising heating the adsorbent material in each chamber of the regenerative adsorption assembly while the purge strewn of gas is supplied to the chamber to facilitate purging of adsorbed material on the adsorbent material therein.

6. The method as recited claim 1, further comprising supplying a purge stream of gas from the outlet of a chamber which is adsorbing contaminants to a chamber being purged.

7. The method as recited in claim 1, further comprising cooling the contaminated air from the atmosphere.

8. A method of treating air for supply to an enclosed space in which it is to be breathed, the method comprising:
   a. admitting air to an air treatment system from atmosphere, the air from atmosphere containing contaminants, the contaminants being other than oxygen, carbon dioxide, and nitrogen which form at least a portion of the air;
   b. mixing the air from atmosphere with recirculated air from the enclosed space, the recirculated air containing carbon dioxide which has been exhaled within the enclosed space;
   c. passing the mixture through a first chamber of a regenerative adsorption assembly comprising at least two such chambers, each chamber containing an adsorbent material for adsorption of (i) the contaminants in the air from atmosphere, and (ii) the carbon dioxide which is present in the recirculated air from the enclosed space as a result of exhalation, so that air that is discharged from the chamber has an acceptable composition for breathing; and
   d. supplying the air from the chamber after it has passed over the adsorbent material to the enclosed space.

9. A method as claimed in claim 8, which further includes adjusting the relative proportions of the air from atmosphere and the air that is recirculated from the enclosed space that are mixed before supply to the enclosed space.

10. A method as claimed in claim 8, in which the air from atmosphere and the air that is recirculated from the enclosed space are mixed upstream of the regenerative adsorption assembly so that the mixed air passes trough one of the chambers for adsorption of contaminants before it is supplied to the enclosed space.

11. A method as claimed in claim 8, further comprising:
   a. passing the mixture through a second chamber of the regenerative adsorption assembly; and
   b. supplying a purge stream of gas to the second chamber of the regenerative adsorption assembly to purge adsorbed material on the adsorbent material therein.

12. A method as claimed in claim 11, which includes heating the adsorbent material in the second chamber while the purge stream of gas in supplied to the absorbent material to facilitate purging of adsorbed material on the adsorbent material therein.

13. A method as claimed in claim 8, wherein the system includes a purge line through which air is supplied to a chamber of the regenerative adsorption assembly in which the adsorbent material is to be regenerated, the purge line supplying air from the outlet from the chamber through which air has flowed for adsorption of contaminants.

14. A method as claimed in claim 8, further comprising supplying cooling air which enters the system from atmosphere.

15. A method as claimed in claim 8, further comprising collecting liquid droplets carried in air that enters the system from atmosphere.

16. A method as claimed in claim 8, further comprising removing particulate contaminants from air entering the system through an inlet tube by way of a filter.

17. A method as claimed in claim 8, further comprising controlling at least one of (a) the temperature and (b) the humidity of the air tat enters the enclosed space.

18. A method as claimed in claim 8, further comprising adjusting the resistance to flow of air through the treatment system by way of (a) at least two recirculation paths having different resistances to flow of air through them; and (b) means for changing the recirculation path through which the recirculated air flows.

19. A method as claimed in claim 8, further comprising forcing air into the enclosed space by way of a blower to maintain the air at a pressure that is above atmospheric pressure.

20. A method as claimed in claim 19, further comprising monitoring the pressure within the enclosed space by way of a pressure sensor, the blower being adjustable according to the monitored pressure to maintain the pressure within the enclosed space below a predetermined maximum pressure.

21. A method as claimed in claim 8, wherein the contaminants comprise matter that must be removed from the air prior to breathing to avoid harmful health affects.

* * * * *